US012746859B2

(12) United States Patent
Barkow et al.

(10) Patent No.: US 12,746,859 B2
(45) Date of Patent: Sep. 29, 2026

(54) APPARATUS FOR QUICKLY ROTATING AN ASSEMBLY OF A VEHICLE SEAT

(71) Applicants: BROSE SITECH GMBH, Wolfsburg (DE); BROSE SITECH SP. Z O.O., Polkowice (PL)

(72) Inventors: Tomas Barkow, Braunschweig (DE); Lukasz Pyziak, Nysa (PL); Michal Dominikowski, Swidnica (PL)

(73) Assignee: BROSE SITECH SP. Z O.O., Polkowice (PL)

( * ) Notice: Subject to any disclaimer, the term of this patent is extended or adjusted under 35 U.S.C. 154(b) by 138 days.

(21) Appl. No.: 18/699,123

(22) PCT Filed: Oct. 5, 2022

(86) PCT No.: PCT/EP2022/077652
§ 371 (c)(1),
(2) Date: Apr. 5, 2024

(87) PCT Pub. No.: WO2023/057490
PCT Pub. Date: Apr. 13, 2023

(65) Prior Publication Data
US 2024/0409012 A1 Dec. 12, 2024

(30) Foreign Application Priority Data
Oct. 6, 2021 (DE) .................... 10 2021 125 946.0

(51) Int. Cl.
*B60N 2/427* (2006.01)
*B60N 2/20* (2006.01)

(52) U.S. Cl.
CPC .............. *B60N 2/427* (2013.01); *B60N 2/20* (2013.01)

(58) Field of Classification Search
CPC ........................... B60N 2/42745; B60N 2/433
See application file for complete search history.

(56) References Cited

U.S. PATENT DOCUMENTS 7,571,963 B2 * 8/2009 Peters .................... B60N 2/236
297/367 R
9,108,545 B2 * 8/2015 Maeda ................ B60N 2/4221

FOREIGN PATENT DOCUMENTS

DE 19652665 C1 * 5/1998 ............ B60N 2/433
DE 10 2007 010 257 A1 9/2008
DE 102008046909 A1 * 6/2009 ............ B60N 2/433
(Continued)

OTHER PUBLICATIONS

International Search Report of PCT/EP2022/077652, Mar. 6, 2023, 4 pages.

*Primary Examiner* — Joshua J Michener
*Assistant Examiner* — Ryan Andrew Yankey
(74) *Attorney, Agent, or Firm* — Lewis Roca Rothgerber Christie LLP

(57) ABSTRACT

The invention relates to an apparatus (10) for quickly rotating an assembly (100) of a vehicle seat, a locking element (40) being secured by means of a cam (30) and being unlocked by means of another cam (20). Furthermore, the rotation of the driving shaft (12) on which the cams (20, 30) are arranged is transmitted to a toothed element (60), resulting in acceleration of the rotatable assembly (100). The invention further relates to a vehicle seat having an arrangement of two apparatuses (10) of this kind, and to a vehicle having at least one apparatus (10) of this kind.

10 Claims, 11 Drawing Sheets

(56) References Cited

FOREIGN PATENT DOCUMENTS

| | | | | | |
|---|---|---|---|---|---|
| DE | 20 2011 052 357 | U1 | | 5/2013 | |
| DE | 10 2013 207 027 | A1 | | 10/2014 | |
| DE | 102013224873 | A1 | * | 6/2015 | ........... B60N 2/2352 |
| FR | 2857305 | A1 | * | 1/2005 | ........... B60N 2/1615 |

* cited by examiner

APPARATUS FOR QUICKLY ROTATING AN ASSEMBLY OF A VEHICLE SEAT

CROSS-REFERENCE TO RELATED APPLICATION(S)

This application is a U.S. National Phase Patent Application of International Application Number PCT/EP2022/077652, filed on Oct. 5, 2022, which claims priority to German Patent Application Number 10 2021 125 946.0, filed on Oct. 6, 2021, the entire content of each of which is incorporated herein by reference.

The invention relates to an apparatus for quickly rotating an assembly of a vehicle seat, the rotatable assembly being a rest or a seat, a locking element being secured by means of a cam and being unlocked by means of another cam. Furthermore, the rotation of the driving shaft on which the cams are arranged is transmitted to a toothed element, resulting in acceleration of the rotatable assembly. The invention further relates to a vehicle seat having an arrangement of two apparatuses of this kind, and to a vehicle having at least one apparatus of this kind.

In hazard situations, such as in the case of an imminent accident, adjustable vehicle seats should be automatically adjusted to an upright, crash-proof position as quickly as possible. Thus, vehicle occupants sitting thereon should be better protected from injury. This involves not only are rests of the vehicle seats being set upright, but also the resetting of the orientation of sitting surfaces that have been titled backwards into a lying position.

In order to set backrests of vehicle seat upright, there are known rotating fittings that are crash-proof in every position, for example, but the effectiveness thereof in adjusting the backrest is poor, and they therefore cannot be quickly adjusted in the event of a crash. In order for the desired effectiveness to be achieved, these fittings have to be combined with larger and/or multiple motors. There are also known two-door fittings that can be unlocked but are not crash-proof in the forward, upright position. They are therefore not suitable for the intended use for quick adjustment of a backrest into a crash-proof position.

The object of the invention is to propose a solution for quickly rotating backrests and/or seats of a vehicle seat, said solution requiring little installation space and, above all, being crash-proof.

The object of the invention is achieved by an apparatus according to Claim 1, a vehicle seat according to Claim 9, and a vehicle according to Claim 10. Further preferred embodiments of the invention can be found in the remaining features set out in the dependent claims.

The apparatus according to the invention for quickly rotating a rotatable assembly of a vehicle seat, the rotatable assembly being a backrest or seat, is formed having

- a first cam, a second cam, a drive shaft and a sprocket, the first cam and the sprocket being non-rotatably arranged on the drive shaft and the second cam being rotatably arranged thereon, the drive shaft being rotatably mounted on the assembly, the first cam being coupled to the second cam by means of a spring element such that, when the drive shaft rotates, the second cam also rotates, the second cam having a first and a second locking contour,
- a locking element which has a locking region and an unlocking region and is rotatably fixed to the assembly,
- a stationary latching element, and
- a toothed element which is rotatable about the assembly axis of rotation, these elements being designed and arranged such that,

- in a first locking position,
  - the locking element is engaged with the latch element, and
  - the first locking contour of the second cam is in physical contact with the locking region of the locking element and secures said locking element in position, and
- while the drive shaft is rotated,
  - the first cam hits the unlocking region of the locking element and thus rotates said locking element out of the engagement with the locking element, while
  - the first locking contour of the second cam is rotated out of the locking region of the locking element, and
  - the sprocket transfers the rotation to the toothed element, the toothed element being rotated about the assembly axis of rotation and thus relative to the latching element until an engagement with the latching element limits the rotational movement, and
- upon further meshing of the sprocket with the toothed element,
  - the rotatable assembly rotates about the assembly axis of rotation until the second locking contour of the second cam meets the locking region of the locking element, said locking region being formed to stop further rotation of the second cam until the locking element engages with the latching element for a second locking position, and
  - the rotation of the second cam is tracked by means of the spring force of the spring element and thus the second locking contour rotates towards the locking region of the locking element in order to secure said locking element in position.

Owing to the interaction between the components or elements present, the apparatus according to the invention allows a rotatable assembly of a vehicle seat to rotate quickly. An assembly of this kind is intended to be a backrest of the vehicle seat or a seat of a vehicle seat. The rest refers to an adjustable backrest of a vehicle seat. The seat is likewise rotatably mounted as an assembly and can therefore be tilted by rotation, in particular backwards, in order to orient the seat so as to be suitable for a lying position of the vehicle seat. This rotation is preferably achieved by means of a toggle lever kinematic system. A vehicle can be any desired vehicle having a vehicle seat that has a backrest that can be adjusted by rotation and/or a seat that can be adjusted by rotation. In addition to passenger vehicles, this also includes heavy goods vehicles and busses.

Within the meaning of the apparatus, the rotation of the rotatable assembly is understood to be a forward rotation of the rest or the vehicle seat into a virtually upright position of the rest or a vertical horizontal position of the seat. The starting position is any desired rearwardly inclined position of the vehicle seat, including a lying position of the seat. Quick rotation aims for it to be possible for the rotation to occur in a very short time frame, such as between the detection and occurrence of an imminent accident.

The basis for the rotation is a drive shaft having two cams and a sprocket. The arrangement and specific configuration thereof are selected such that all of the known components or elements functionally engage and/or interact with one another in the manner described below.

The drive shaft is rotatably mounted on the assembly, i.e. depending on the embodiment, it is arranged in a rest or a seat in a position of the rest or the seat and stays there, but it can rotate in the intended fashion. This position can be a frame of the rest or the seat, for example. A first cam is arranged on the drive shaft. Owing to its function, said cam can be referred to as an unlocking cam, as will be shown. Said first cam is non-rotatably arranged on the drive shaft; thus, said first cam rotates together with the drive shaft.

The second cam can also be referred to as a securing cam and is rotatably arranged on the drive shaft. Said second cam can therefore rotate independently of the drive shaft. So that said second cam follows, or is able to follow, the rotation of the drive shaft, said second cam is coupled to the first cam by means of a spring element. Said spring element establishes an engagement or coupling between the two cams such that, when the drive shaft rotates, the second cam is tracked and rotates together with the drive shaft and the first cam.

Moreover, the second cam has a first locking contour and a second locking contour. In each case, the contour of the second cam is understood to be configured or shaped in a way that is suitable for another object to be held or secured in a locked state by interaction with said object. The size and shape of the locking contours are based on the correct arrangement of the other object.

In the case of the apparatus according to the invention, said other object is the locking element, which further has a locking region and an unlocking region. The locking element is rotatably mounted on the assembly and therefore has a fixed point of rotation on the assembly. In this case too, the fixed point can preferably be provided on the frame of the rest or the seat. The locking element has a locking region. This is the region in which the locking element interacts with the first locking contour and later the second locking contour of the second cam in order to secure the locking element in a locking position. The interaction of the first locking contour of the second cam and the locking region of the locking element is the starting condition for a first locking position, and the interaction of the second locking contour of the second cam with the locking region of the locking element is the starting condition for the second locking position. The locking region of the locking element is preferably configured as a shaped or elevated portion in the contour of the locking element facing the second cam.

The locking element further comprises an unlocking region in which said unlocking region can interact with the first cam during rotation of the drive shaft. In this case too, the contour of the locking element is formed in a complementary fashion for this purpose, in this case so as to complement the first cam.

The apparatus further comprises a stationary latching element. Stationary means that the latching element is not moved and/or rotated during rotation of the assembly. The latching element for quick rotation of the rest can be rigidly connected to the supporting structure of the seat, for example. In principle, the latching element can be also be intended to be moved and/or rotated, although it is essential for said element not to change its position and/or orientation during the rotation of the assembly.

In the starting position, the locking element is engaged with the latching element (first engagement region). This position is secured by the interaction of the first locking contour of the second cam and the locking region of the locking element since they are in physical contact in said regions and in particular do not allow rotation of the locking element. This combination results in the first locking position, which is also the starting position for the quick rotation of the assembly.

To allow rotation of the rotatable assembly, the apparatus according to the invention is provided with a toothed element that is mounted so as to be rotatable about the assembly axis of rotation. Said toothed element can also therefore rotate about an axis identical to the axis of rotation of the assembly. However, this rotation is limited in that, between the toothed element and the latching element, an engagement is provided, which allows the toothed element to rotation only to the intended extent, as will be demonstrated.

The rotation of the toothed element and the rotation of the rotatable assembly is achieved because the sprocket arranged on the drive shaft transfers the rotational movement thereof to the toothed element. In the process, the toothed element rotates until the above-mentioned stop in relation to the latching element. The mentioned stop or engagement can be implemented, for example, by a cut-out in the latching element and a corresponding pin on the toothed segment such that the rotation is limited when the pin stops against the end of the cut-out.

During this first period of rotation of the drive shaft until the rotational movement of the toothed element is limited, the locking element is unlocked at virtually the same time that it stops being secured. In order to unlock the locking element, it must be released from its secured state by the interaction of the locking contour of the second cam and the locking region of the locking element. This is achieved since the second cam is carried out by means of the spring element during rotation of the drive shaft and is thus rotated out of the first locking position. During this rotation, the first cam is also moved and in doing so meets the unlocking region of the locking element. Since the position thereof is no longer secured by the second cam, the locking element can rotation about the axis of rotation thereof and thus release the engagement with the latching element.

Since the rotational movement of the toothed element is limited and any further rotation thereof is prevented, but the sprocket continues to transfer the rotation of the drive shaft to the toothed element, the rotatable assembly rotates. In the process, the first and second cams also initially continue to rotate, and the first cam rotates out of the unlocking region of the locking element.

The second cam continues to rotate until the second locking contour thereof meets the locking region of the locking element. Since the locking element still rotates out of the starting position thereof, the locking region acts an obstacle to the rotation of the second cam while the drive shaft continues to rotate together with the first cam.

Since the first cam and the second cam are coupled by means of the spring element, said spring element is now tensioned. This does not significantly impair the rotation of the drive shaft. The rotation of the rotatable assembly continues. In the process, the locking element is moved towards a second engagement region of the locking element, with which the locking element is intended to engage. If the forward movement is far enough, the locking element can reach the position of engagement with the latching element by rotating back to the starting position thereof, i.e. tipping or jumping into the target position, informally speaking. This position is the starting condition for the second locking position. In this case too, the position of the locking region of the locking element is changed such that the spring force of the tensioned spring element is large enough that the rotation of the second cam continues or follows after. As a result, the second locking contour is brought towards the locking region of the locking element, i.e. into the immediate vicinity thereof, such that said locking element is secured in its position. In the process, physical contact can also be established between the locking region of the locking element and the second locking contour, but this contact is not absolutely necessary for it to be secured. Either way, the second locking position, i.e. the target position, is then reached upon rotation of the rotatable assembly.

With the apparatus according to the invention, an adjustable backrest or seat can be quickly rotated forwards from any desired rearwardly inclined position. Owing to the design of the apparatus having cams and complementary locking contours or locking regions, the apparatus is also crash-proof, i.e. the position of the assembly remains secure, even in the event of increased exertion of force, such as in the event of an accident.

In order to benefit the most from the apparatus according to the invention, it is intended for at least two instances of the apparatus to be arranged in or on a vehicle seat, specifically preferably on the sides of the particular assembly, more preferably on the sides of said assembly while facing outwards relative thereto. In this way, it is possible to provide a vehicle seat that is formed having two of the described apparatuses on the rest and/or the seat. Thus, one apparatus of this kind described, optionally in embodiments thereof as described below, is provided on each side of an adjustable rest, for example. In this case, a drive shaft can provided for each individual apparatus, but a shared drive shaft is also within the scope of the invention. However, in the case of independent drive shafts for the two apparatuses, said drive shafts be driven simultaneously and to the same extent in order to prevent twisting and/or jamming of the assembly during rotation. This can be achieved by a joint drive for the drive shafts.

In a preferred embodiment of the apparatus according to the invention, the drive shaft is driven by means of a motor, a gas generator or a spring device. However, in the apparatus, a motorized drive should be provided for driving the drive shaft alone and be coupled to the power supply of the vehicle. Preferably, a motorized drive of this kind is an electric motor, more preferably a servo motor. In addition to the driving of the drive shaft, servo motors also make it possible to determine the extent to which or the angle through which the motor shaft and thus the drive shaft has already rotated, such that a servo motor for completing the rotation of the rotatable assembly can be switched off so as not to apply any further rotation to the drive shaft.

A gas generator contains a solid propellant and an ignition unit. The latter is ignited by a pulse of current in the event of deployment. The resulting hot gas can be used to drive and rotate the drive shaft by means of a suitable mechanical system.

A spring device for driving the drive shaft is independent of a connection to a power supply or energy store belonging to the vehicle. For this purpose, the spring device comprises at least one spring element which is held in the starting position in a pretensioned position. A spring of this kind can be a helical spring or a gas spring. The spring device further comprises a trigger mechanism in order to release the pretensioned spring such that said spring releases its tension and in doing so drives the drive shaft of the apparatus according to the invention. In addition to being independent pf a power supply, a configuration having a spring device is also advantage because it allows very quick rotation of the assembly. The spring travel of the at least one spring provided in the spring device determines the angle of rotation of the drive shaft and should be selected accordingly.

In a second embodiment of the invention, the toothed element has an engagement with a component fixedly mounted on the assembly in order to limit the relative movement of the rotatable assembly relative to the toothed element. In this case, it is intended for the rotational movement of the rotatable assembly to be limited in order to prevent the rest or the seat from over-rotating or rotating beyond the intended extent. This can be achieved by forming an engagement between the toothed element and any desired component fixedly mounted on the assembly, said engagement allows rotation only to the desired extent. The component fixedly mounted on the assembly can be the frame of the rest or the seat, for example. In particular, it can be intended for the toothed element to have a cut-out and for a pin to be arranged on the component fixedly mounted on the assembly, said pin engaging in the recess and stopping against the ends of the cut-out when the maximum desired rotation is reached, thereby limiting said rotation. In this way, it can be ensured that the rotatable assembly rotates no further than the crash-proof position, in which the devices for protecting the vehicle occupant can be as effective as possible.

In another embodiment of the invention, the latching element has a stop and/or has chamfered edges in the region of the engagement for the second locking position in order to guide the locking element into the second locking position. In order to quickly and securely guide the locking element into the second locking position and to reduce the risk of a malfunction due to external influences, it may be appropriate for a stop to be provided on the latching element, said stop preventing further forward movement and forcing the locking element to rotate or snap into the second engagement region of the latching element. The locking element therefore cannot be moved beyond the second engagement region.

Alternatively or additionally, it may be provided that, in the region of the engagement of the locking position, edges that are chamfered or angled at least in regions can be formed in the latching element such that the locking element can slide into the second locking position. This is intended to make it easier to establish the engagement in the second engagement region. These chamfered or angled edges can extend straight or with one or several radii.

In a further embodiment of the invention, the sprocket is not formed as full circle but only as a circle segment, the opening angle of which being reduced to such an extent that movement is transferred to the toothed element only as far as is necessary. Since it is known how far the drive shaft must rotate to allow the rotatable assembly to rotate as far as necessary, it can also be determined, in conjunction with typical geometric constraints by interaction of the elements of the invention provided according to the invention, how many teeth the sprocket must have along the circumference thereof and how long its circumference must be to achieve this. This results in the opening angle of the circle segment for the sprocket. Optimizing the sprocket to suit the necessary transfer of movement in this way saves installation space and also material in the production of the sprocket.

The apparatus can be connected to a control device of the vehicle in order to be triggered in the event of an imminent accident. Vehicles of modern construction usually detect their surroundings and the surrounding traffic. The vehicles can then determine the probability of an imminent accident (also referred to as a crash detection). This is usually done by means of an arithmetic unit of the vehicle. If an unavoidable accident or a sufficiently high probability of its occurrence is detected, said arithmetic unit triggers said safety devices, either directly or by interaction with other decentralized arithmetic units of individual security devices, in order to protect the vehicle occupant(s). In this embodiment of the invention, it is provided that said trigger mechanism also has the apparatus for quickly rotating a rotatable assembly of a vehicle seat, i.e. that the apparatus is connected to the control device in order to trigger quick rotation of the rest of seat by means of the apparatus according to the invention in the event of an imminent accident.

In an advantageous embodiment of the invention, the rotation of the assembly can be reset. Situations may arise in which the apparatus has rotated the assembly as intended, for example, because an accident was imminent. If this accident was able to be avoided and/or only minor damage was sustained, without affecting the vehicle seat and its functionality, it may be desired for the assembly to be reset and thus guided from the second locking position (target position) back into the first position (starting position). In this case, the rotation of the drive shaft must be reversed. During the reversal of the rotation, the above-described sequence and the interaction of the elements take place in reverse such that said elements reach their starting position and are ready to operate again.

In the simplest cast, the reset can be triggered manually, for example if the vehicle is tested in a workshop after one of the described events. However, it may also be provided that the reset is completed by a motor, for example by the provision of an electric motor having an appropriate speed ratio for the sprocket, in order to reverse the rotation of the drive shaft. If the drive of the drive shaft is already motorized, the backrest can also be reset by means of said motor and a rearward rotation.

In a further embodiment of the apparatus according to the invention, when the rotatable assembly is quickly rotated, the speed and/or the expended force is able to be adjusted depending on the weight of the person located on the vehicle seat. The exertion of force during rotation of the assembly is dependent on the person located on the vehicle seat, in particular on their weight. In this way, a rest or a seat can be rotated with less force if a slim person is using the vehicle set than if a strong, large person is sitting thereon. Conversely, this means that the rotation of the assembly with the same exertion of force may be perceived to be unpleasant or too forceful for a lighter person or may even lead to injury and/or pain. To counter this, the speed during rotation of the assembly and/or the exerted force during rotation of the assembly should be adapted to the person.

The weight of the person located on the seat can be determined by appropriate sensors and/or by means of prediction from images captured by an interior monitoring system of the vehicle on the basis of the stature and size of the person on the seat. The determined weight can be used to determine the force and/or upright-setting speed required to set the assembly upright. This can be done, for example, using a control device which is provided in the apparatus or with which said apparatus interacts. The speed and/or force exertion can be adjusted by means of an adjustment via the drive of the drive shaft. If a drive is provided by means of a spring device, for example, suitable measures can be taken to damp the spring action of the spring in order to reduce the speed during rotation and/or the force exertion. In the case of a motorized drive, said drive can be simply turned down.

The invention also relates to a vehicle having at least one apparatus of the kind described, such that at least one rest or seat of an adjustable vehicle seat can be quickly rotated within the meaning of the invention.

The apparatus according to the invention makes it possible to quickly rotate a vehicle rest into a crash-proof position, when required. However, the apparatus is also suitable, for example, for performing quickly rotating the rest for an "easy-entry rest" in which the rest of a front seat of a two-door vehicle is to be quickly rotated forwards in order to make it easier for a person to enter the back seat. As a result of the design having two cams and the interaction with the other elements provided in the apparatus, the rotated assembly remains in position even in the case of larger external exertions of force, meaning that the safety devices of the vehicle are fully effective in protecting the vehicle occupant(s).

The various embodiments of the invention set out in this application are advantageously able to be combined with one another unless otherwise specified.

The invention is described below with reference to exemplary embodiments on the basis of the associated drawings, in which.

Figure 1:
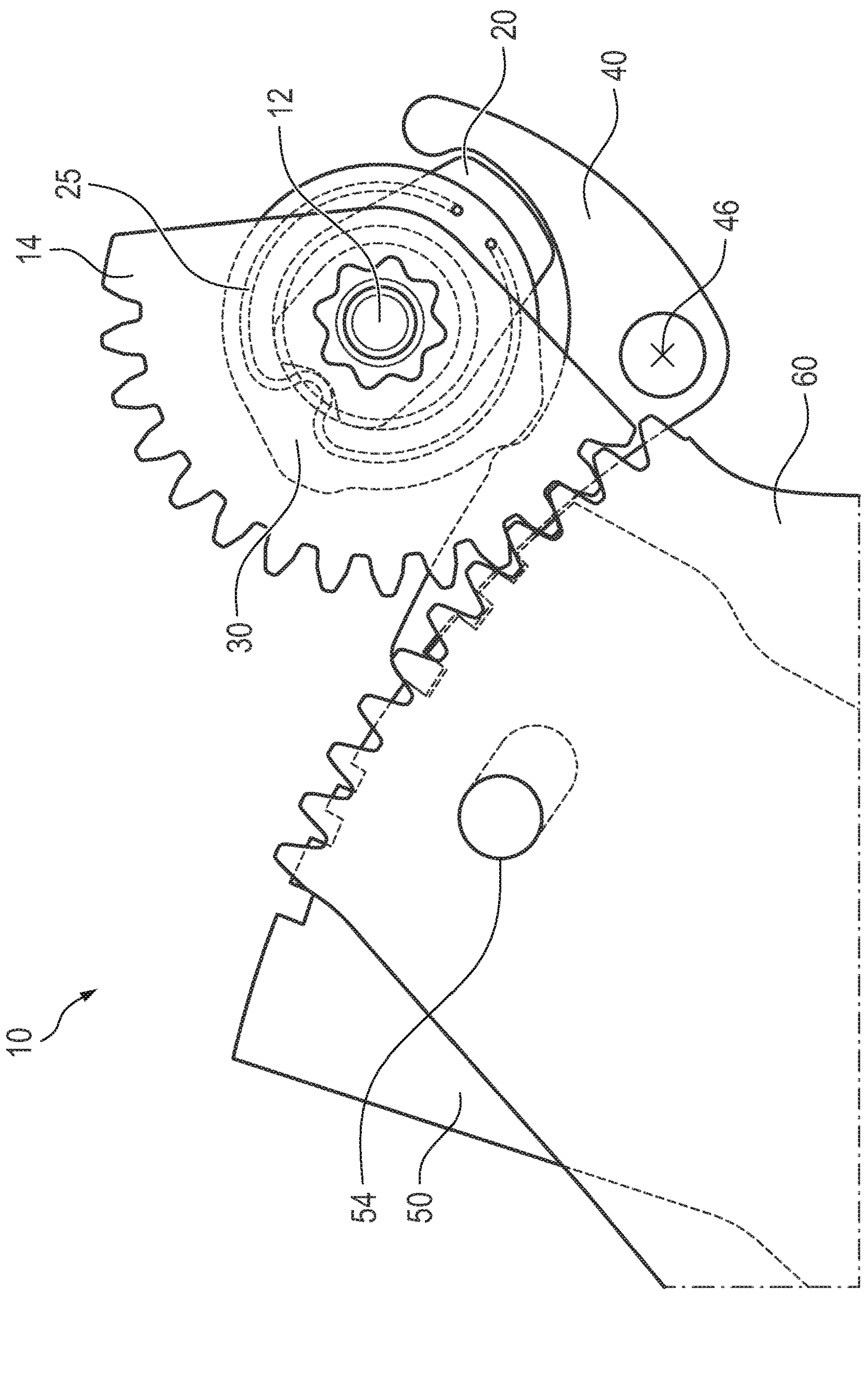
FIG. 1 shows an example of an apparatus for setting a rest upright.
Figure 2:
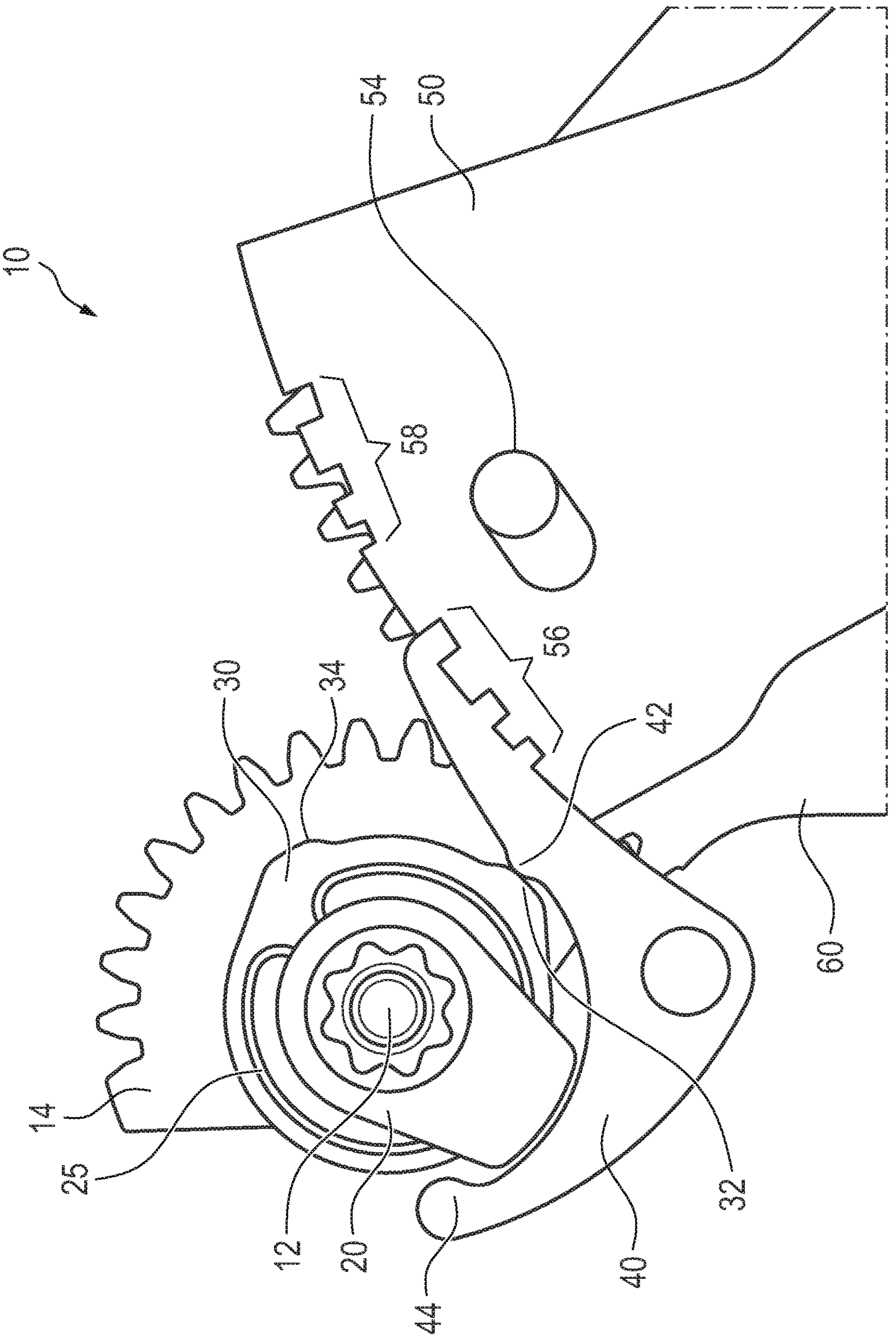
FIG. 2 shows the apparatus from FIG. 1 from a different direction.
Figure 3:
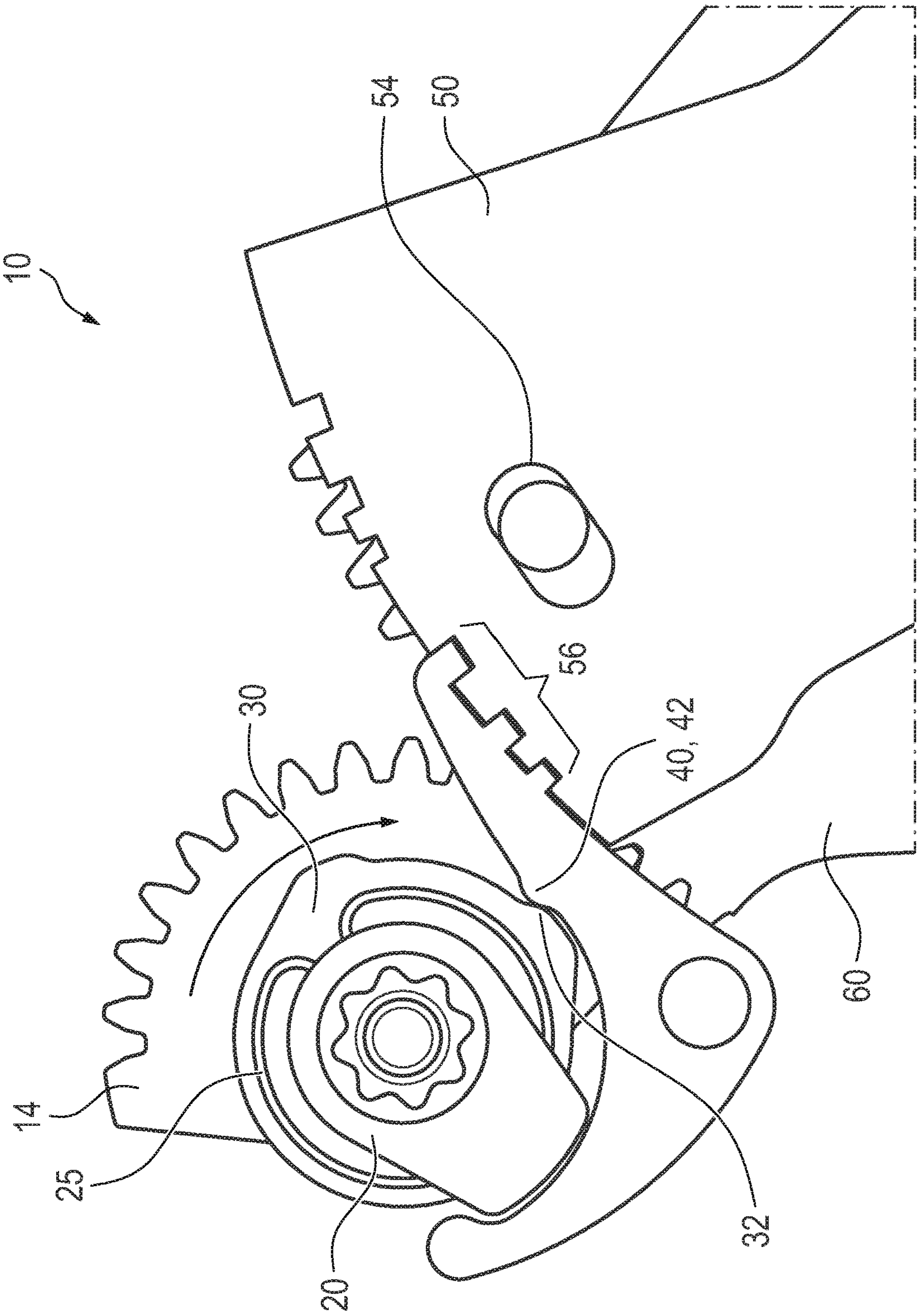
FIGS. 3 to 9 show the interaction of the components or elements of the apparatus from FIG. 1.

FIG. 1 shows an example of a structure of the apparatus 10 according to the invention for use in an assembly 100 in the form of a rest of a vehicle seat. In FIG. 2, the apparatus is shown from the rear side, and both figures will be explained together. Two instances of the apparatus 10 are provided in an adjustable backrest of a vehicle seat in a vehicle. In principle and in the same way, the apparatus 10 can also be provided on a toggle lever kinematic system of a seat of a vehicle and cause the same to rotate.

The apparatus 10 is formed having a drive shaft 12 and two cams 20, 30 arranged thereon. The drive shaft 12 is rotatably mounted on the rest. The first cam 30 is the unlocking cam and is arranged on the drive shaft for conjoint rotation. The second cam 30 is the securing cam and is rotatably mounted. The first cam 20 and the second cam 30 are coupled to one another by means of a spring element 25 such that, when the drive shaft rotates, the second cam 30 also rotates.

The second cam 30 has a first locking contour 32 and a second locking contour 34, which are each formed as shaped portions of the otherwise uniformly curved contour of the second cam 30.

The apparatus 10 further has a sprocket 14, by which the rotation of the drive shaft 12 is transferred to a toothed element 60 that is also provided in the apparatus 10. The sprocket 14 is configured merely as a circle segment in order to save installation space and material. The opening angle of the circle segment is enough to transfer enough rotational movement of the drive shaft 12 to set the rest upright.

A locking element 40 is rotatably mounted on the assembly, i.e. on the rest in this embodiment. The axis of rotation thereof is labeled with reference sign 46 in FIG. 1. In a first engagement region 56, the locking element 40 is meshed with the latching element 50, which is a further element of the apparatus 10. Together with the toothed element 60, the latching element 50 forms an engagement 54 that limits the rotation of the toothed element 60 about the axis of rotation of the rest (corresponds to the axis of rotation of the assembly, which is not shown here). The engagement 54 is formed, for example, having a cut-out in the latching element 50 and a pin arranged on the toothed element 60, the pin engaging with the cut-out and being able to move therein if the toothed element 60 is rotated. If the pin stops against the end of the cut-out in the latching element 50, the rotational movement of the toothed element 60 is limited and cannot be continued.

The locking element 40 further comprises a locking region 42 and an unlocking region 44, the action of which is illustrated in the following figures.

FIGS. 2 to 9 demonstrate the interaction of the elements or components of the apparatus 10 according to the invention when the rest 100 is set upright. The movement directions are each indicated by an arrow in the drawings.

FIGS. 1 and 2, the starting position of the apparatus 10. The first locking contour 32 of the second cam 30 is contact with the locking region 42 of the locking element 40 and secures the position of said locking element. Here, the locking element, as already mentioned, is meshed with the latching element 50 in the first engagement region 56 thereof.

The drive shaft 12 then begins to rotate. The sprocket 14 then rotates as well and transfers the rotation to the toothed element 60. Subsequently, said toothed element is rotated about the axis of rotation of the rest and moves to the left, in relation to FIG. 2. In the process, the pin also moves within the cut-out in the latching element 50 towards the stop therefor in the engagement 54.

Figure 4:
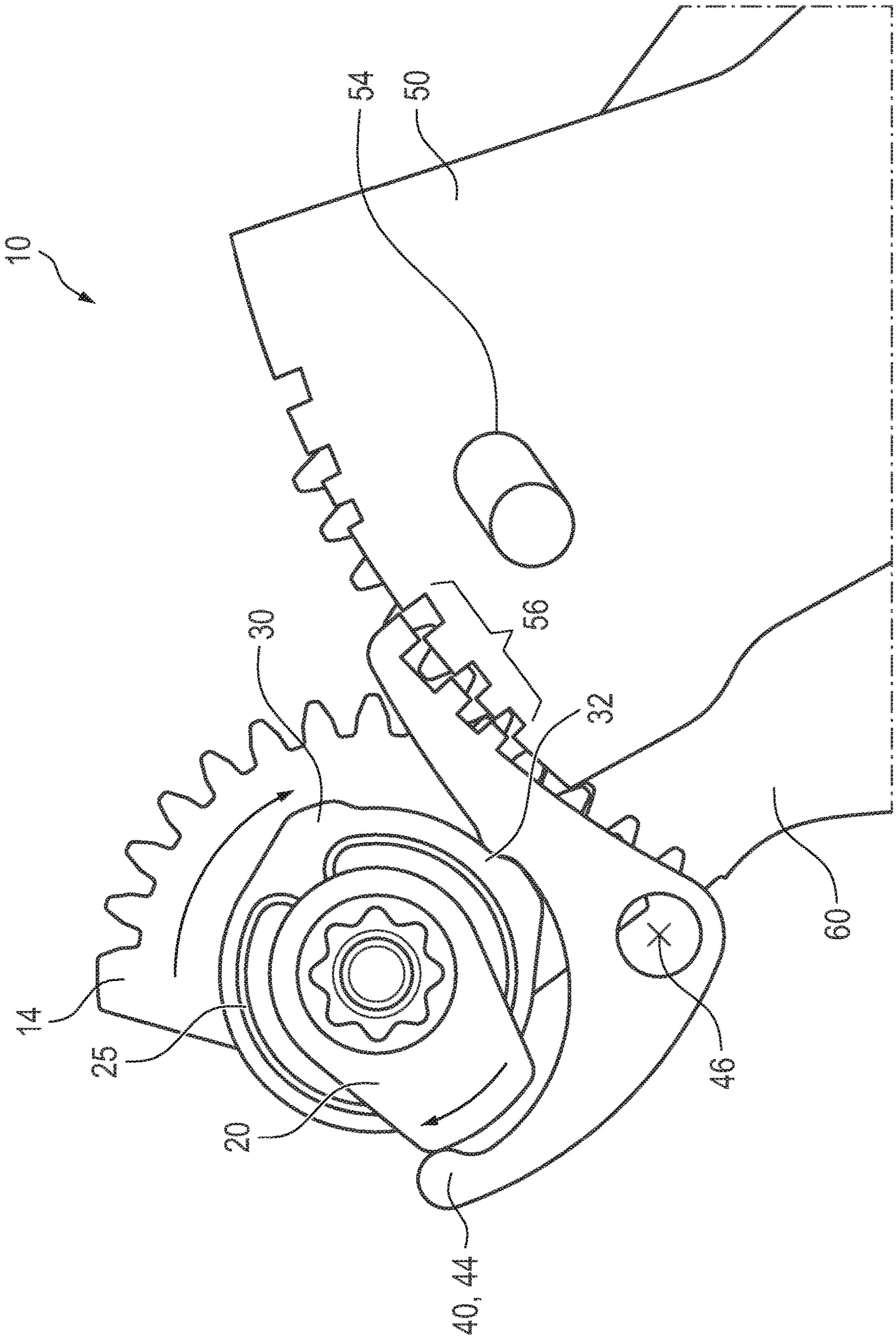
Figure 5:
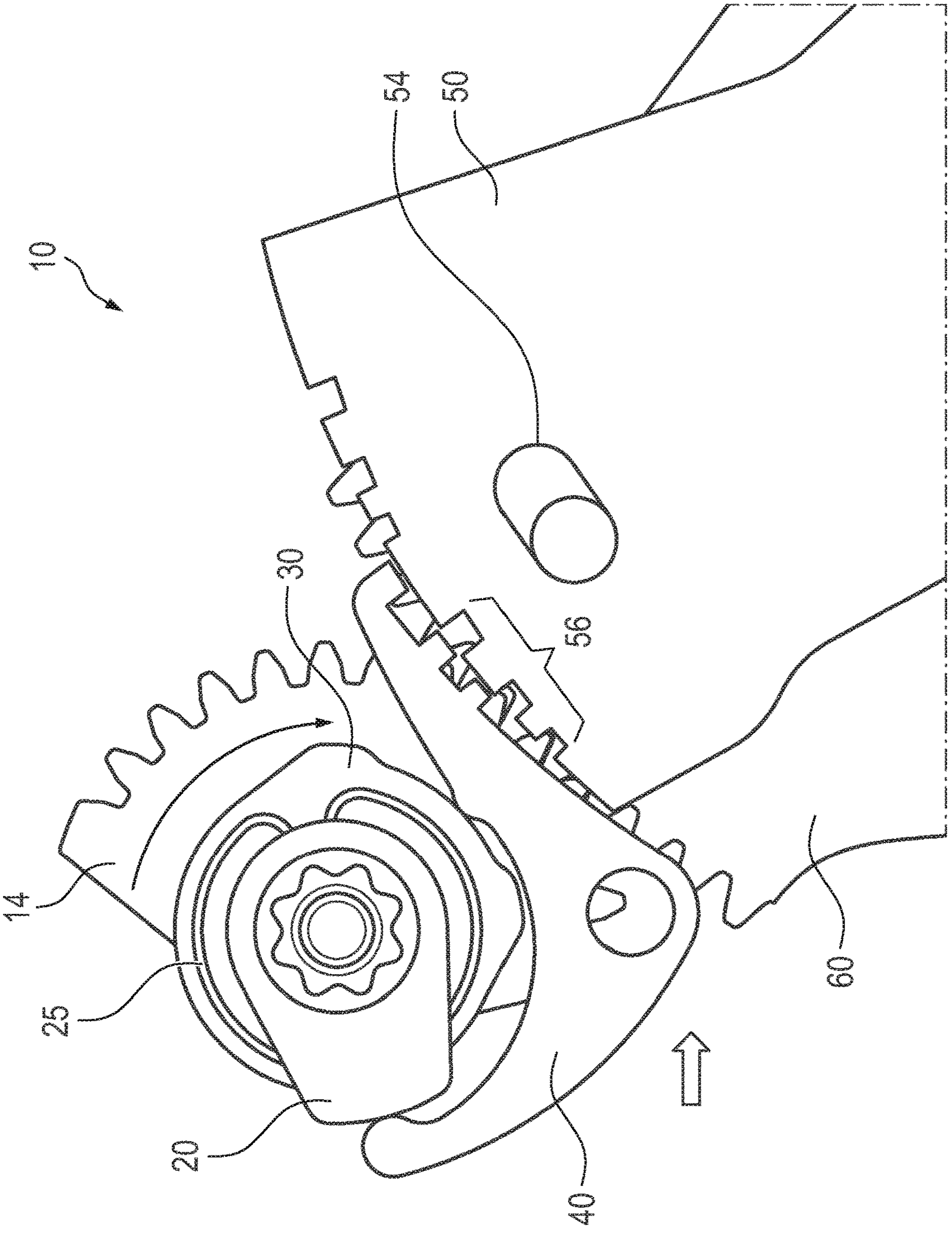

As a result of the rotation of the drive shaft 12, the securing cam (second cam) 30 is also rotated by means of the spring element 25 during rotation of the first cam 20, thereby moves away from the locking region 42, and thus releases the locking element 40. FIG. 4 shows how, almost simultaneously, the first cam 20 meets the unlocking region 44 of the locking element 40 and, upon further rotation, rotates the unsecured locking element 40 outwards about the axis of rotation 46 thereof such that said locking element is no longer meshed with the latching element 50.

The drive shaft 12 and thus the elements arranged thereon continue to rotate. Since the pin has reached its stop in the engagement 54 in FIG. 5, the toothed element 60 can no longer rotate relative to the latching element 50. The transfer of rotation by means of the sprocket 14 thus drives the rest forwards along the now stationary toothed element 60, labeled by the arrow pointing to the right in FIG. 5.

Figure 6:
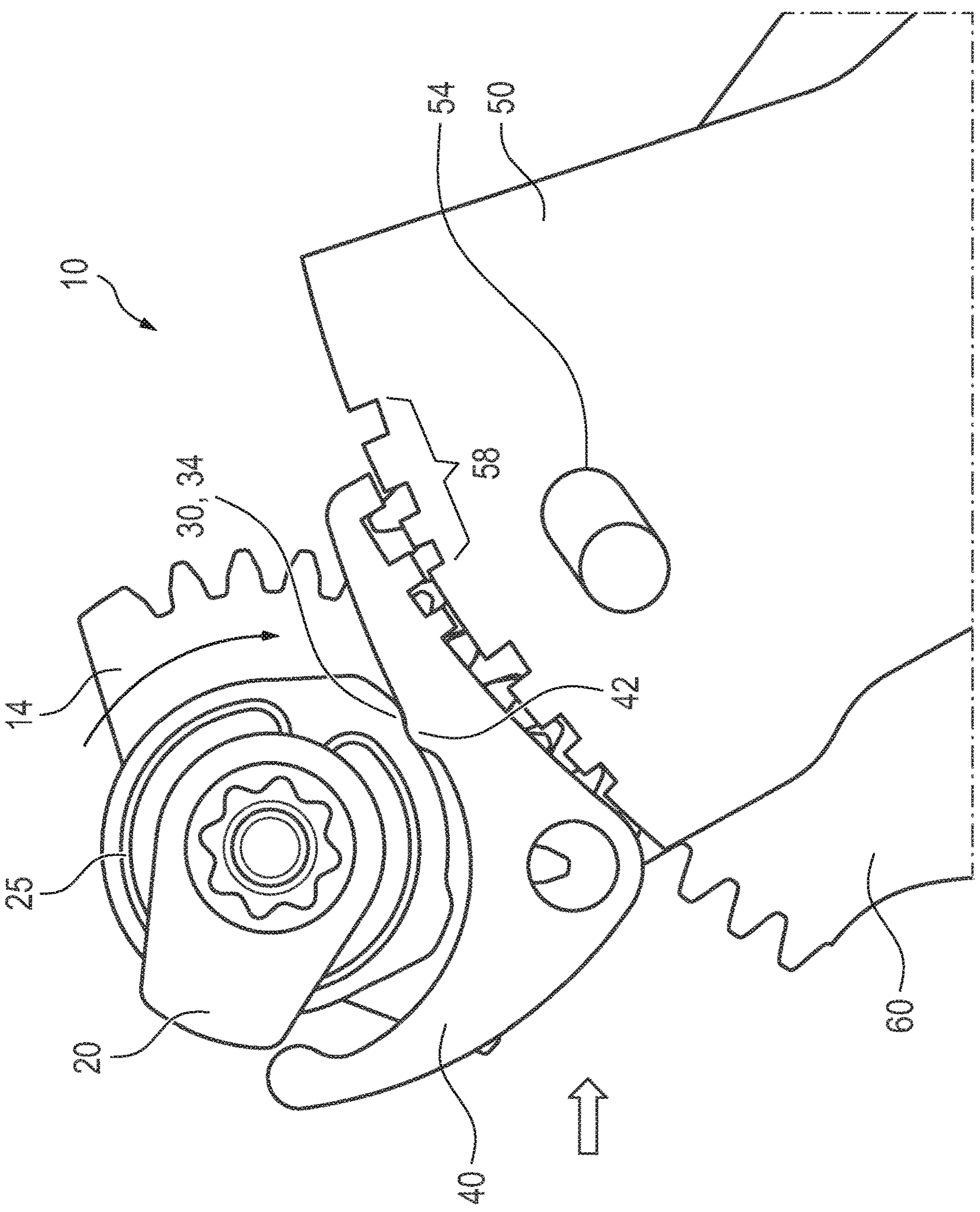

In FIG. 6, the drive shaft 12 continues to rotate, while the forward movement of the rest continues. In the process, the first cam 20 rotates from the unlocking region 44 of the locking element 40. Moreover, the second locking contour 34 of the second cam 40 meets the locking region 42 of the locking element 40. Said locking element has moved towards the second engagement region 58 on the latching element 50, but is not yet meshing therewith. Therefore, the angle of rotation of the locking element 40 is not yet reset, and the locking region 42 forms an obstacle for the second locking contour 34 of the second cam 30. The spring force of the spring element 25 between the first cam 20 and the second cam 30 is not enough to continue the rotation of the second cam 30.

Figure 7:
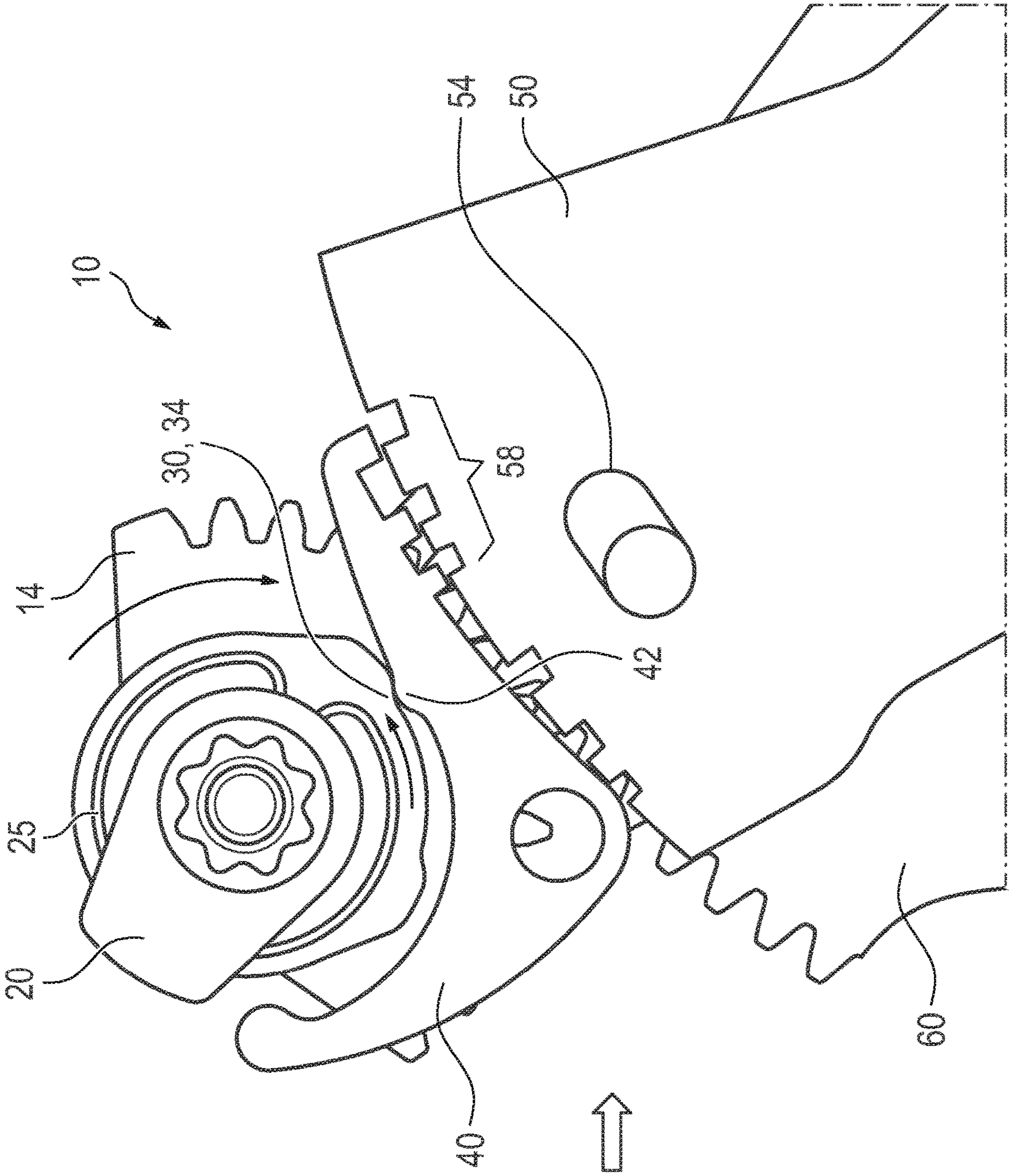

FIG. 7 shows how the drive shaft 12, the sprocket 14 and the first cam 20 continue to rotate, while the second cam 30 remains in position, thereby tensioning the spring element 25. The locking element 40 has almost reached the second engagement region 58 with the latching element 50.

Figure 8:
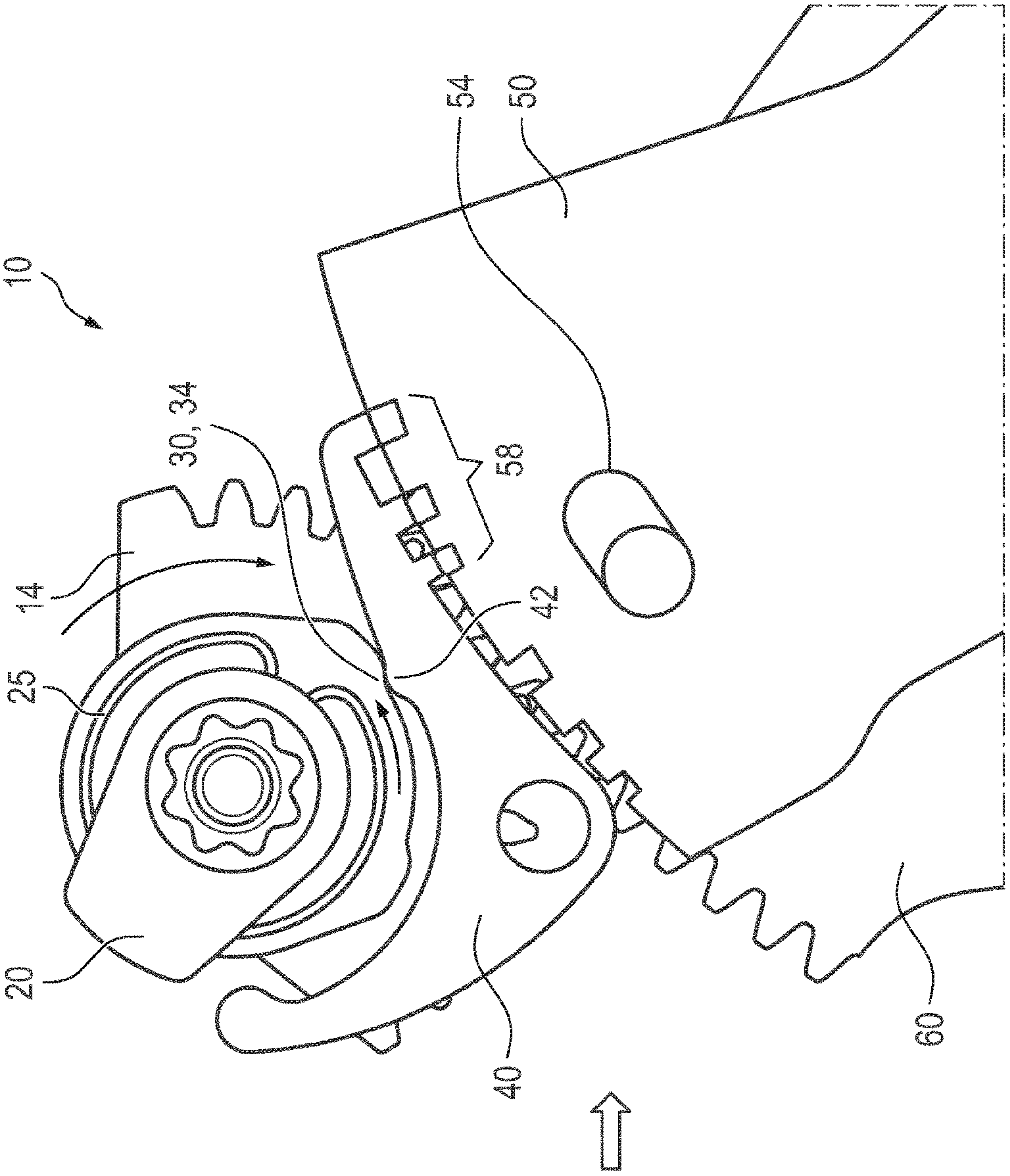
Figure 9:
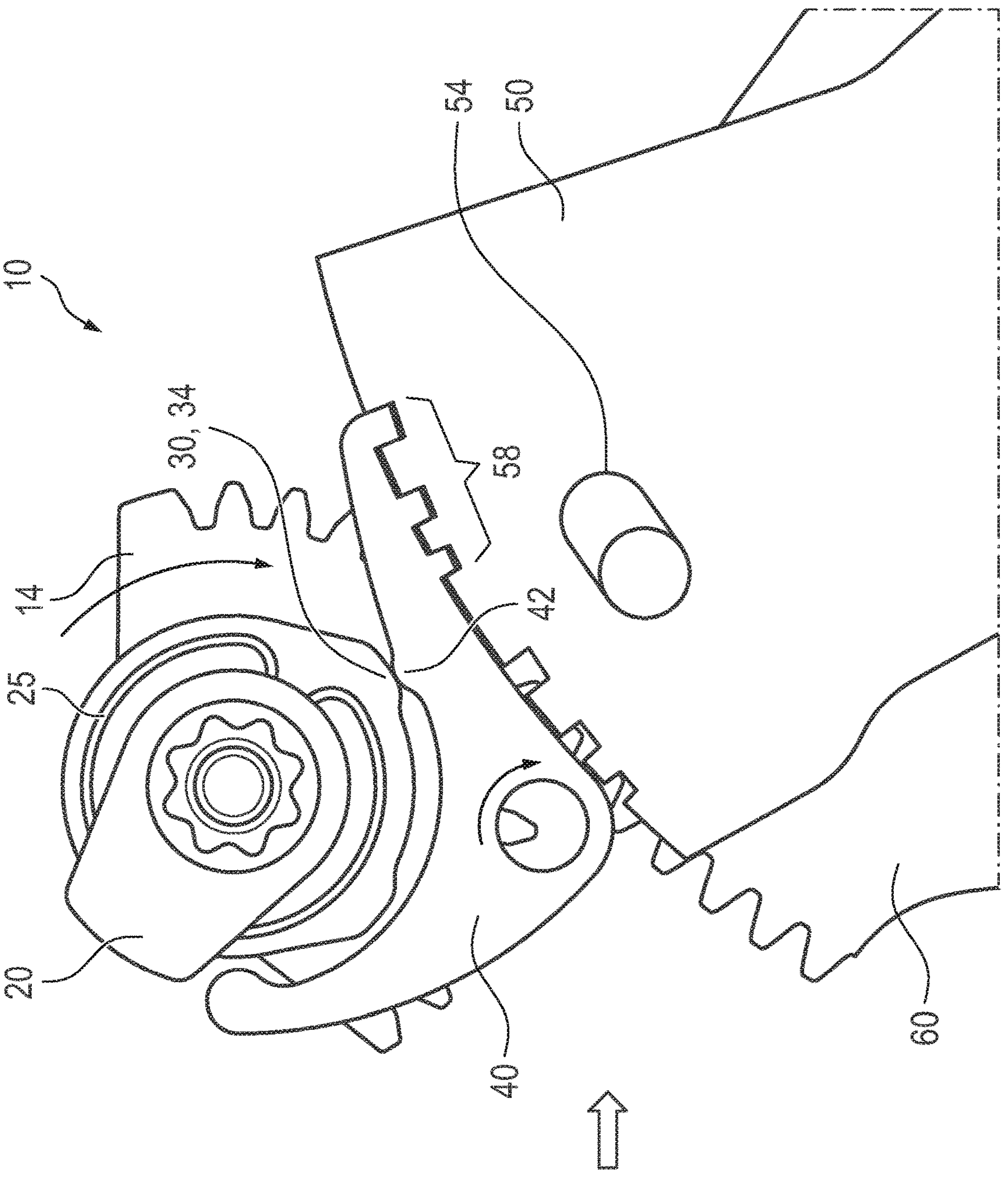

In FIG. 8, the sprocket rotates into its end position. In the process, the relative position between the locking element 40 and the latching element 50 is reached, as is required for the meshing with the second engagement region 58, which then takes place in FIG. 9. As a result of the meshing of the latching element 50 and the locking element 40, the locking element 40 rotates back to its starting position. The spring force of the spring element 25 is enough to continue the rotation of the second cam 30, such that the second locking contour 34 thereof moves over the locking region of the locking element 40 and thus secures said locking element in the second locking position.

FIG. 10 shows part of the apparatus 10 according to the invention when installed in a vehicle rest 100. In comparison with the preceding figures, the upright direction of the rest is now directed to the left.

The rest 100 rotates about the axis of rotation 110 thereof. The apparatus 10 is intended to be triggered when an accident is imminent in order to protect the vehicle occupant (s). In the process, the drive shaft 12 is driven by means of a spring device 120 which is tensioned in the starting position in FIG. 10*a* and is largely relieved of tension just short of the end position in FIG. 10*b*. The spring device 120 is formed having a trigger mechanism (not shown), which can be actuated by a control device that detects the imminent accident in order to trigger to said trigger mechanism. By means of a spring device 120 of this kind, the rest can be set upright in under 200 ms, which corresponds to the advance time for detecting the immediately imminent accident.

So that the locking element 40 is not moved beyond the second locking region 58 during the forward rotation of the rest 100, a stop 140 is provided on the latching element 50. As a result, the locking element 40 is guided to the second locking position. For the same reason, i.e. the limitation of the forward rotation of the rest 100, the engagement 82 between the frame 80 of the rest and the toothed element 60 is provided by means of a cut-out and a pin.

Figure 10A:
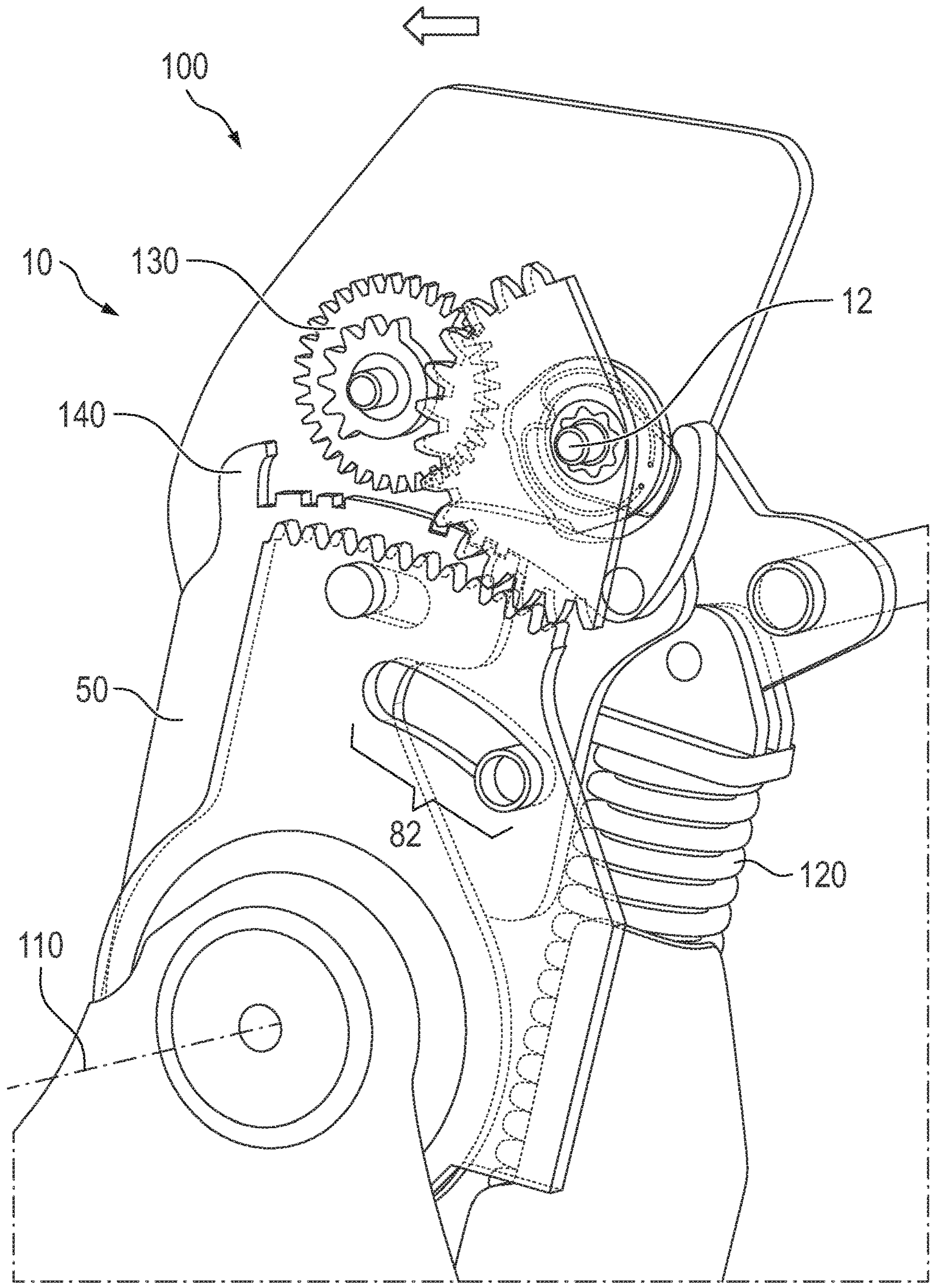
FIG. 10 shows the apparatus according to the invention from FIG. 1 in the context of a rest.
Figure 10B:
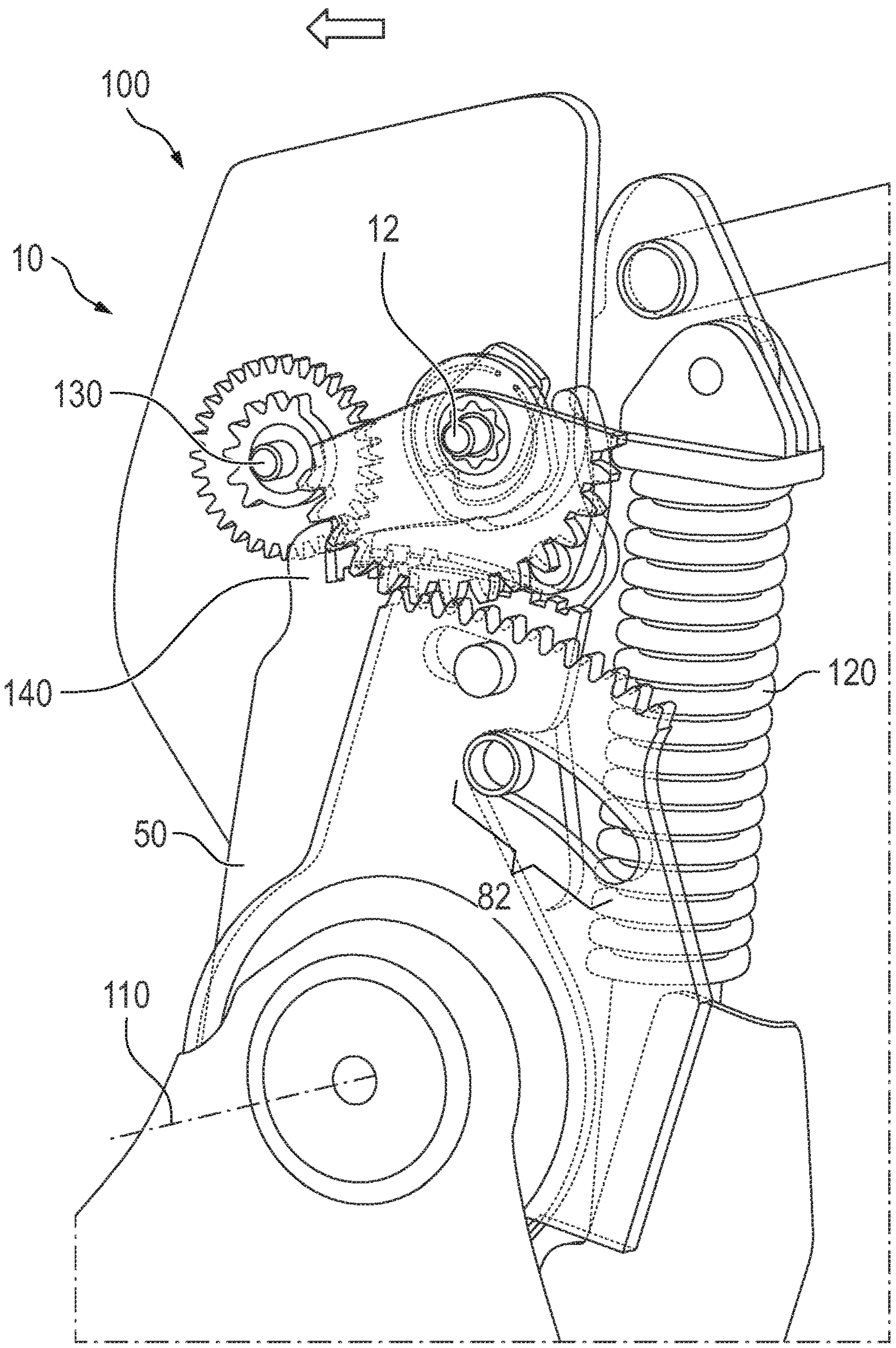

If, after the rest 100 is set upright, it is desired to reset the apparatus 10, this can be done by means of the resetting device 130, which is shown in FIGS. 10*a* and 10*b*, by way of example. Said resetting device is implemented by means of an electric motor (not shown) and a speed change system for the sprocket 14 such that said sprocket rotates backwards and thus resets the apparatus 10 to the starting position thereof.

LIST OF REFERENCE SIGNS

- 10 Apparatus
- 12 Drive shaft
- 14 Sprocket
- 20 First cam (unlocking cam)
- 25 Spring element
- 30 Second cam (securing cam)
- 32 First locking contour
- 34 Second locking contour
- 40 Locking element
- 42 Locking region
- 44 Unlocking region
- 46 Axis of rotation of the locking element
- 50 Latching element
- 52 Stop for latching element
- 54 Engagement of latching element with toothed element
- 56 First engagement region
- 58 Second engagement region
- 60 Toothed element
- 70 Spring device
- 80 Rest frame
- 82 Engagement of toothed element with rest frame
- 100 Rotatable assembly
- 110 Axis of rotation of assembly
- 120 Spring device
- 130 Resetting device
- 140 Stop for the latching element 50

The invention claimed is:

1. An apparatus (10) for quickly rotating a rotatable assembly (100) of a vehicle seat, the rotatable assembly (100) being a backrest or a seat cushion, comprising a first cam (20), a second cam (30), a drive shaft (12) and a sprocket (14), the first cam (20) and the sprocket (14) being non-rotatably arranged on the drive shaft (12) and the second cam (30) being rotatably arranged thereon, the drive shaft (12) being rotatably mounted on the assembly, the first cam (20) being coupled to the second cam (30) by means of a spring element (25) such that, when the drive shaft (12) rotates, the second cam (30) also rotates, the second cam (30) having a first locking contour (32) and a second locking contour (34), a locking element (40) having a locking region (42) and an unlocking region (44) that is rotatably fixed to the assembly, a stationary latching element (50), and a toothed element (60) which is rotatable about an axis of rotation (110) of the assembly (100)

the aforementioned elements being formed and arranged such that, in a first locking position, the locking element (40) is engaged with the latching element (50), and the first locking contour (32) of the second cam (30) is in physical contact with the locking region (42) of the locking element and secures said locking element in position, and while the drive shaft (12) is rotated, the first cam (20) hits the unlocking region (44) of the locking element (40) and thus rotates said locking element out of the engagement with the latching element (50), while the first locking contour (32) of the second cam (30) is rotated out of the locking region (42) of the locking element (40), and the sprocket (14) transfers a rotation of the second cam (30) to the toothed element (60), the toothed element (60) being rotated about the axis of rotation (110) of the assembly (100) and thus relative to the latching element (50) until an engagement (54) with the latching element (50) limits a rotational movement of the toothed element (60), and upon further meshing of the sprocket (14) with the toothed element (60), the rotatable assembly (100) rotates about the axis of rotation (110) of the assembly (100) until the second locking contour (34) of the second cam (30) meets the locking region (42) of the locking element (40), said locking region being formed to stop further rotation of the second cam (30) until the locking element (40) engages with the latching element (50) for a second locking position, and the rotation of the second cam (30) is tracked by means of the spring force of the spring element (25) and thus the second locking contour (34) rotates towards the locking region (42) of the locking element (40) in order to secure said locking element in position.

2. The apparatus (10) according to claim 1, wherein the drive shaft (12) is driven by means of a motor, a gas generator or a spring device (70).

3. The apparatus (10) according to claim 1, wherein the toothed element (60) has an engagement with a component fixedly mounted on the assembly in order to limit the relative movement of the rotatable assembly (100) relative to the toothed element (60).

4. The apparatus (10) according to claim 1, wherein the latching element (50) has a stop (52) and/or has chamfered edges in a region of the engagement between the latching element (50) and the locking element (40) for the second locking position in order to guide the locking element (40) into the second locking position.

5. The apparatus (10) according to claim 1, wherein a basic surface of the sprocket (14) is formed as a circle segment, an opening angle of the circle segment being reduced to such an extent that only movement of the sprocket (14) necessary to rotate the toothed element (60) is transferred to the toothed element (60).

6. The apparatus (10) according to claim 1, wherein the apparatus (10) is connected to a control device of the vehicle in order to be triggered in the event of an imminent accident.

7. The apparatus (10) according to claim 1, wherein the rotation of the rotatable assembly (100) is able to be reset, in by a motor.

8. The apparatus (10) according to claim 1, wherein, when the rotatable assembly (100) is rotated, a speed and/or an expended force is able to be adjusted depending on a weight of a person located on the vehicle seat.

9. A vehicle seat having an assembly (100) which is adjustable by rotation and is formed to have at least two apparatuses (10) according to claim 1.

10. A vehicle having at least one device (10) for quickly rotating a rotatable assembly (100) according to claim 1.

* * * * *